(12) United States Patent
Rhinehart

(10) Patent No.: US 6,374,328 B1
(45) Date of Patent: Apr. 16, 2002

(54) GENERATION COMPUTER WITH PROGRAM-IN-CHIPS (PIC)

(75) Inventor: James A. Rhinehart, Midland City, AL (US)

(73) Assignees: Sony Corporation, Tokyo (JP); Sony Electronics, INC, Ridge, NJ (US)

( * ) Notice: Subject to any disclaimer, the term of this patent is extended or adjusted under 35 U.S.C. 154(b) by 0 days.

(21) Appl. No.: 08/958,977

(22) Filed: Oct. 28, 1997

(51) Int. Cl.[7] .............................................. G06F 12/00
(52) U.S. Cl. ........................... 711/115; 713/2; 361/686
(58) Field of Search ........................ 711/101–115, 167, 711/164; 710/72, 301; 361/686; 713/2

(56) References Cited

U.S. PATENT DOCUMENTS

| | | | | | |
|---|---|---|---|---|---|
| 5,049,728 A | * | 9/1991 | Rovin | ........................ | 235/492 |
| 5,177,891 A | * | 1/1993 | Holt | ............................ | 43/17.1 |
| 5,293,610 A | * | 3/1994 | Schwarz | ...................... | 711/164 |
| 5,522,076 A | * | 5/1996 | Dewa et al. | ................... | 713/2 |
| 5,538,436 A | * | 7/1996 | Garney | ........................ | 439/270 |
| 5,579,522 A | * | 11/1996 | Christeson et al. | ......... | 395/652 |
| 5,615,355 A | * | 3/1997 | Wagner | ........................ | 711/167 |
| 5,630,110 A | * | 5/1997 | Mote, Jr. | ..................... | 395/556 |
| 5,634,079 A | * | 5/1997 | Buxton | ........................ | 710/72 |
| 5,673,174 A | * | 9/1997 | Hamirani | ..................... | 361/686 |
| 5,703,759 A | * | 12/1997 | Trimberger | .................. | 361/777 |
| 5,748,912 A | * | 5/1998 | Lee | ............................. | 710/102 |
| 5,802,325 A | * | 9/1998 | Roux | .......................... | 710/102 |
| 5,895,278 A | * | 4/1999 | Humphrey | .................. | 439/101 |

OTHER PUBLICATIONS

Main Board User's Guide (1995).*

* cited by examiner

*Primary Examiner*—Do Hyun Yoo
*Assistant Examiner*—Nasser Moazzami
(74) *Attorney, Agent, or Firm*—Rader, Fishman & Grauer

(57) ABSTRACT

A new generation computer system includes a CPU console having a processor and core system circuitry formed on a motherboard, at least one storage device, such as a hard drive, a PIC unit, and at least one PIC chip mounted thereon. The PIC chip includes a read only memory area storing a computer application program, and a read-write memory area that stores user input data, such as preference settings. PIC chips are removably mounted on the PIC unit via ZIF sockets such that PIC chips may be interchangeable.

30 Claims, 3 Drawing Sheets

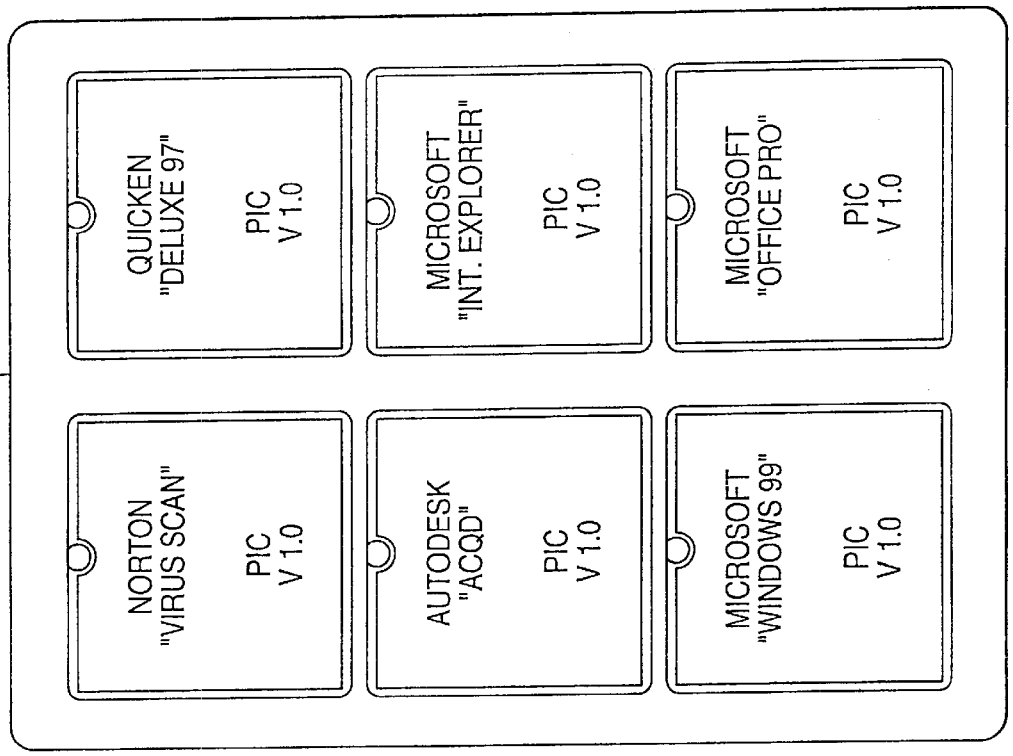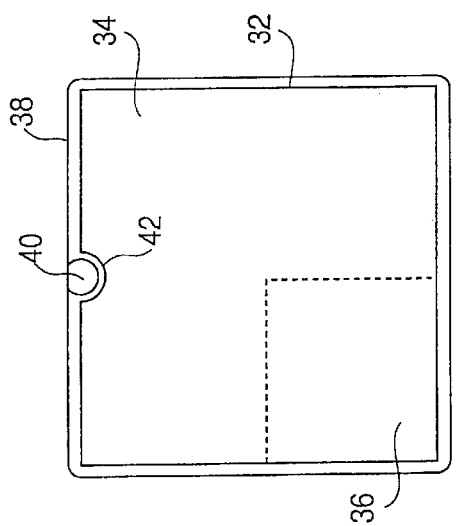

GENERATION COMPUTER WITH PROGRAM-IN-CHIPS (PIC)

FIELD OF INVENTION

The present invention relates to computer systems in general. In particular, the present invention is directed to computer systems that use applications programmed on plug-in program chips.

BACKGROUND OF THE INVENTION

Computer systems in general in the last decade have taken amazing strides in technological advancements to produce powerful, user-friendly computing systems for the work place as well as for the home at an affordable cost. No longer do the computer machines occupy large, environmentally controlled rooms that need to be programmed using reams of punch cards to calculate simple mathematical equations. The advent of semiconductor technology of integrated circuits have revolutionized computer systems to fit on desk tops, lap tops, and even in the palm of the user's hands.

To supply the new computer systems with useful applications, software companies have matched technological advancements in hardware with software applications that are user-friendly and yet power enough for common users to produce products previously reserved for professionals with specialized equipment. Unfortunately, these application programs have evolved into programs that require large amounts of processing power and computer memory space. In order to meet application system requirements, manufacturers and users alike need to upgrade existing computer systems with more storage space, i.e., hard drives, and more computer memory, i.e., RAM ("Random Access Memory") to use newer application programs being released on the market.

One of the main problems with current computer systems is that the installation or upgrade procedures of computer programs are becoming more time consuming. Because of the increasing complexity of the application, more component files and system configurations need to be copied from the installation disks into the computer system's hard drive. Consequently, application installation packages require swapping of many diskettes on which the files are stored during installation procedures. Furthermore, a user must be present during the installation procedure to answer queries, make setting selections, and swap diskettes all of which can take at least twenty-five to thirty minutes and sometimes longer.

Another common problem faced by users is corrupted or missing files that can "crash" or render a program inoperable. The necessary files that are stored on the system hard drive can be deleted or overwritten unintentionally because other programs stored on the computer use the same hard drive. Users also contribute to the problem by "cleaning" the storage area for other files, inadvertently removing critical system files. Consequently, users must retrieve all the installation material and perform the long and tedious procedure to reinstall the program.

Yet another problem with current computer systems is the speed of the application being used. Because application programs are becoming larger and more complex, the speed of the machine is significantly affected when trying to use one of these applications. Furthermore, these large applications with requirements for fast processing speeds and frequent hard drive access are detrimental to computer systems with limited electrical power, i.e., laptop or notebook computers running on battery.

SUMMARY OF THE INVENTION

The problems of the above-referenced deficiencies of the prior art computer systems are overcome by the computer of the present invention. The present invention is directed to a computer system that uses plug-in program chips. In particular, the new generation computer system of the present invention includes a CPU ("Central Processing Unit") console, the console including a processor and core system circuitry fabricated on a motherboard, at least one storage device for storing and retrieving data files, a PIC ("Program-in-Chip") unit, and at least one PIC chip mounted thereon. The PIC chip is removably mounted on the PIC unit via ZIF ("Zero Insertion Force") sockets such that other PIC chips may be interchangeable on the PIC unit The PIC chips include a read-only memory portion and a read-write memory portion. Read-only memory portion has stored therein a computer application program. Read-write memory portion has stored therein user input data.

In one embodiment, the PIC unit is built on the motherboard, such that PIC chips are accessible via access panels built into the CPU console directly above the PIC unit.

An alternate embodiment of the present invention further includes a daughter board onto which the PIC unit is built. The daughterboard is either fixedly or removably attached to the motherboard for the processor to execute the application program stored on a PIC chip mounted on the PIC unit.

One advantage is that processing speed will increase significantly since the system processor is no longer limited by access speeds of the respective drives on which current computer systems store the application program. Data access from PIC chips are almost instantaneous since there are no moving parts in a memory chip. Furthermore, valuable system RAM ("Random Access Memory") space is conserved since the program no longer needs to be loaded into the RAM.

Another advantage is that tedious, time consuming installation procedures are eliminated. Since all the necessary files are coded on the PIC chips, a user does not have to fumble with swapping the correct diskettes during setup. Simply inserting the desired program PIC chip into the PIC unit is all that is necessary to be able to use a particular application.

Yet another advantage is that less electrical power is consumed during computer usage. The main source of power consumption in computer systems is the hard drive. Since all system applications are stored in the hard drive, constant power is supplied thereto. However, the computer system of the present invention does not have to supply constant power to the hard drive since all applications are accessed from PIC chips, which need significantly less power to operate. System drives, such as floppy, CD-ROM, and hard drives are only accessed when a document needs to be saved or retrieved. This feature is especially advantageous in systems with limited electrical power, such as notebooks running on battery.

BRIEF DESCRIPTION OF DRAWINGS

The features and inventive aspects of the present invention will become more apparent upon reading the following detailed description, claims, and drawings, of which the following is a brief description:

FIG. 2 is a top view of a PIC chip of the present invention.

FIG. 3 is a top view of an example of a PIC unit.

DETAILED DESCRIPTION OF THE INVENTION

Figure 1:
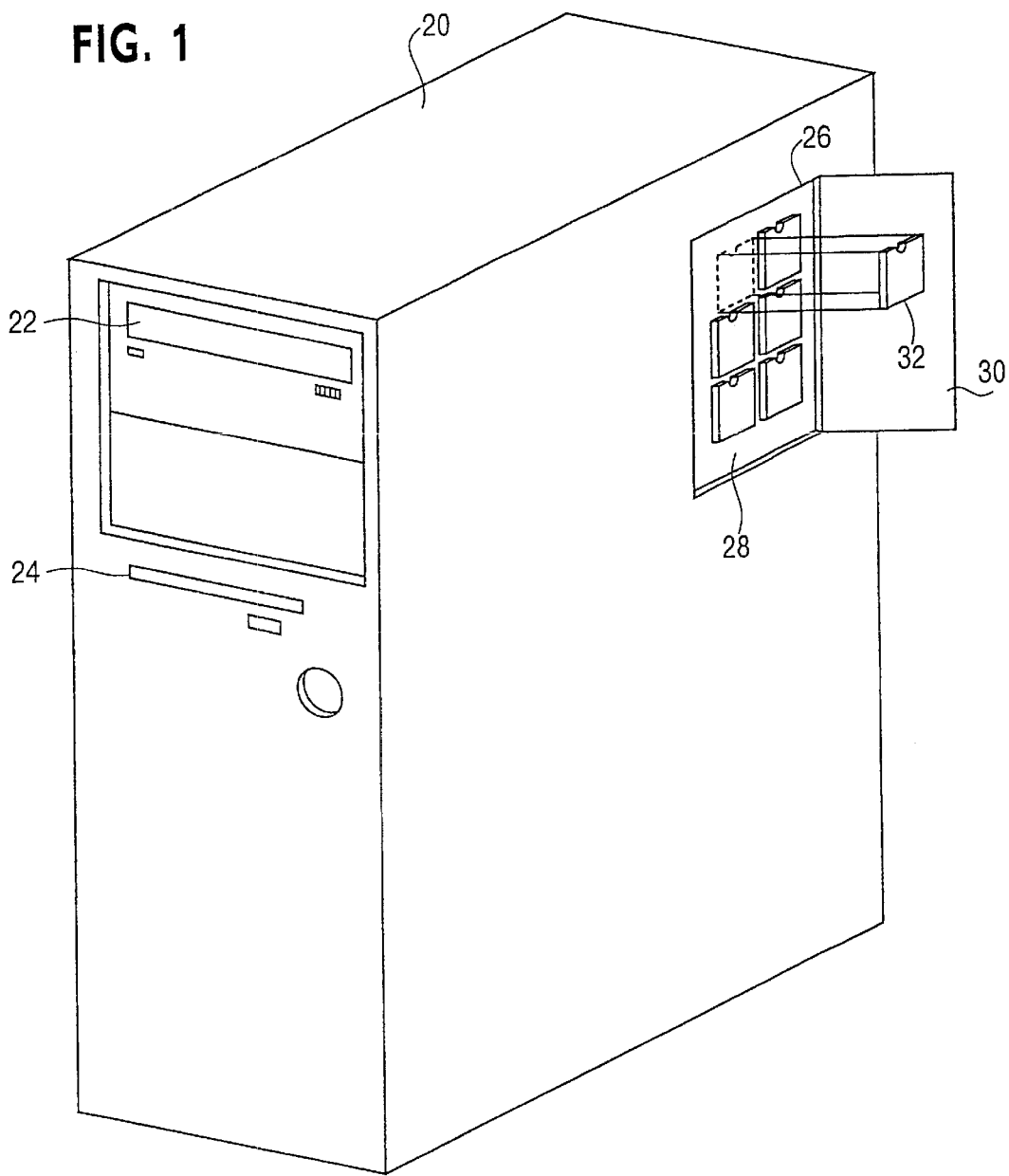
FIG. 1 is a perspective view of a computer system according to the present invention.

FIG. 1 shows a computer system of the present invention. For example purposes only, CPU ("Central Processor Unit") console 20 has CD-ROM ("Compact Disk Read-Only Memory") drive 22, floppy drive 24, hard drive (not shown), and PIC ("Program-In-Chip") unit 26. CPU console 20 is a tower-type console that sits upright longitudinally, but other types of consoles may be used.

PIC unit 26 in the embodiment shown in FIG. 1 consists of six ZIF ("Zero Insertion Force") sockets built into motherboard 28 exposed through access panel 30. Six sockets in 3×2 configuration are shown in FIG. 1 for illustrative purpose only. Other socket configurations may be used without departing from the scope of the present invention. ZIF sockets are preferable because no additional tools are needed to insert and remove PIC chip 32. Further, usage of ZIF sockets reduce the possibility of damaging PIC chip 32 during insertion and removal procedures.

Access panel 30 is hingedly attached to the side of CPU console 20 to permit access to PIC unit 26. However, other configurations may be used to permit access to PIC unit 26. For example, access panel 30 may be a removable cover, or it may be a sliding panel. Any suitable access panels may be used without departing from the scope of the present invention.

PIC chip 32 is basically a memory chip with an application program stored thereon, such as a word processing program, a spreadsheet program, etc. Preferably, PIC chip 32 is a SLSI ("Super Large Scale Integration") or ULSI ("Ultra Large Scale Integration") type device, but other appropriately sized integrated circuits may be used. As shown in FIG. 2, PIC chip 32 has a read-only memory ("ROM") area 34 and a read-write memory ("RWM") area 36. ROM area 34 is a programmable read-only memory ("PROM") and RWM area 36 is an electrically erasable programmable read-only memory ("EEPROM"). However, other types of memory may be used without departing from the scope of the invention.

ROM area 34 is programmed with the application software program. In this way, none of the necessary system files and critical settings can be inadvertently deleted or manipulated by a user. RWM area 36 is used to store user input data, such as preference settings including, but not limited to, font type, color, default parameters, etc. that a user set to customize the application. All documents that are created using applications on PIC chips are stored on floppy diskettes, hard drive, or re-writable CD-ROMs.

Each ZIF socket 38 is equipped with guide member 40 and PIC chip 32 has guide groove 42 formed thereon. In this way, PIC chip 32 cannot be inserted incorrectly since PIC chip 32 will not fit in ZIF socket 38 unless guide groove 42 is matched with guide member 40 on ZIF socket 38. FIG. 3 shows an example of the type of PIC chips that can be employed with CPU console 20. Although six PIC chips are being used for example purposes, PIC unit 26 may be configured to receive more or less number of chips depending on the targeted end user.

Preferably, PIC unit 26 is built directly onto motherboard 28 of CPU console 20 such that PIC unit 26 is accessible from the side of CPU console 20. A motherboard is a printed circuit board that has the system processor and other core system circuitry installed thereon. However, not all CPU consoles house the motherboard on the side of the casing. For example, desktop, laptop, notebook, and palmtop consoles house the motherboard on the bottom of the casing. Although, this configuration does not affect the operability of the computer system of the present invention, it may pose an inconvenience when PIC chips need to be changed.

Figure 4:
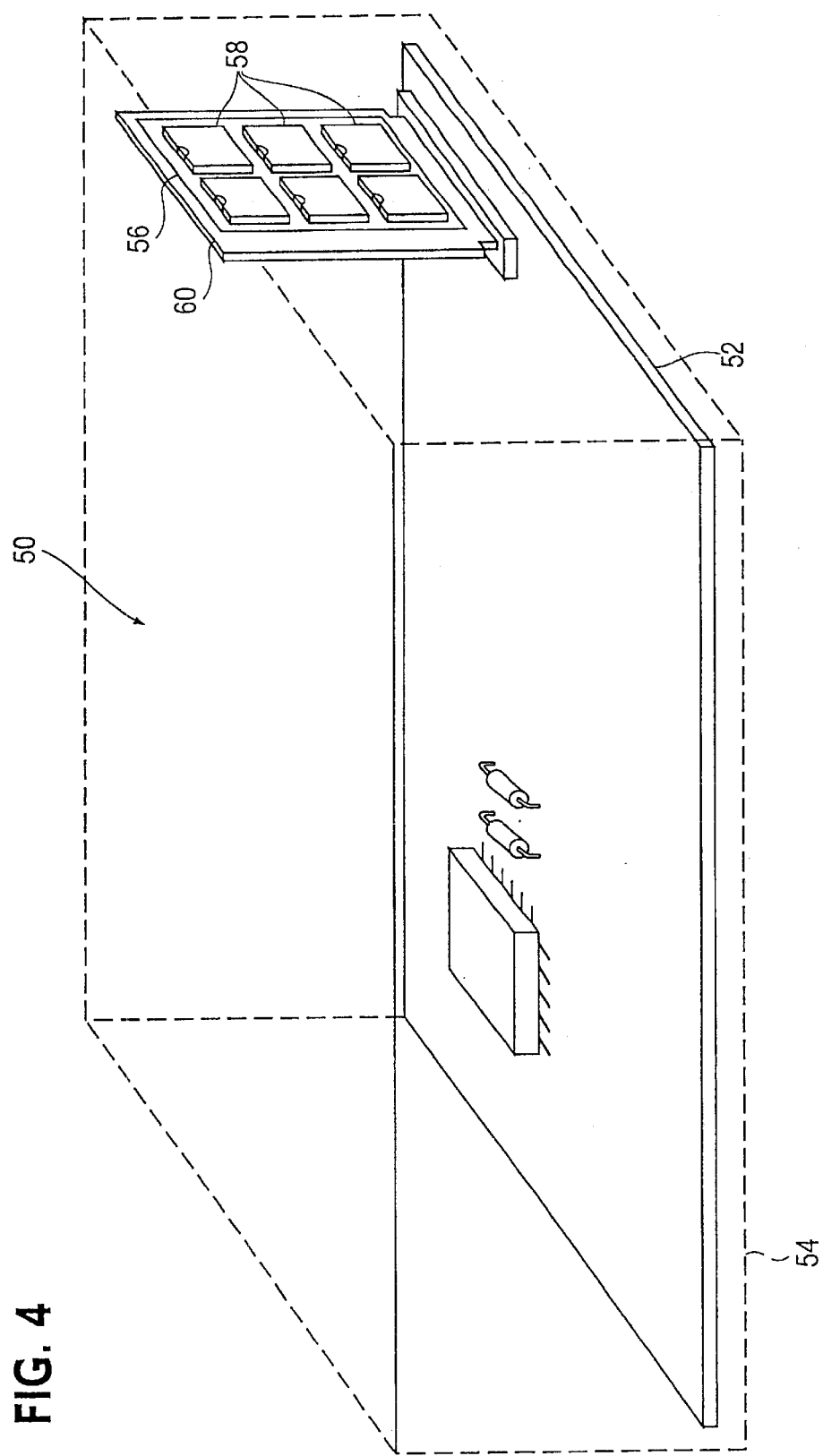
FIG. 4 is an alternate embodiment of the present invention.

In an alternate embodiment as shown in FIG. 4, CPU console 50 has motherboard 52 installed therein on the bottom of housing 54. In order to facilitate easy physical access to PIC chips 58, PIC unit 56 is formed on dedicated daughterboard 60. A daughterboard is a printed circuit board with peripheral devices installed thereon that connects to the motherboard. Some examples of conventional daughterboards used in current computer systems are ISA ("Industry Standard Architecture) and PCI ("Peripheral Component Interconnect") cards. By placing PIC unit 56 on daughterboard 60, PIC chips 58 are positioned on the side of housing 54 instead of on the bottom to facilitate easy physical access. Although daugherboard 60 is shown being attached to motherboard 52 in a vertical position, motherboard 52 and daughterboard 60 may be configured to be placed in any desired position without departing from the scope of the present invention.

Having fully described the preferred embodiments of the invention, variations and modifications may be employed without departing from the scope of the present invention. For example, daughterboard PIC units may be a plug-in type that can be interchanged to allow upgrades to PIC units that accommodate more PIC chips than the previous. Also, the computer system of the present invention may be incorporated into any type of computer system currently available, such as desktops, towers, or notebook formats. Accordingly, the following claims should be studied to learn the true scope of the present invention.

What is claimed is:

1. A computer system, said computer system comprising:
   an integrated circuit memory chip, said memory chip having a read-only memory portion and a read-write memory portion, said read-only memory portion storing at least one executable application program and said read-write memory portion storing user input data, said user input data including preference settings;
   a program-in-chip unit, said program-in-chip unit being structurally adapted to removably mount said memory chip onto said program-in-chip unit;
   a motherboard, said motherboard being structurally adapted to support said program-in-chip unit and being electrically interfacible with said memory chip,
   wherein the user input data and said at least one executable application is used to customize the system to a new preference setting.

2. A computer system of claim 1 further comprising:
   a computer system enclosure, said computer system enclosure encasing said memory chip, said program-in-chip unit and said motherboard; and
   an access panel, said access panel being located on said computer system enclosure and providing access to said memory chip.

3. A computer system of claim 1 wherein said memory chip is removably mounted onto said program-in-chip unit.

4. A computer system of claim 1 wherein said memory chip is one of a plurality of memory chips being removably mounted on said program-in-chip unit.

5. A computer system of claim 1 wherein said motherboard includes a processor, said processor executing said at least one executable application program.

6. A computer system of claim 1 further comprising:
a daughterboard, said daughterboard being mounted on said motherboard.

7. A computer system of claim 6 wherein said daughterboard is structurally adapted to support said program-in-chip unit.

8. A computer system of claim 1 wherein said program-in-chip unit includes at least one socket, each socket of said at least one socket being structurally adapted to removably mount said memory chip onto said program-in-chip unit.

9. A computer system of claim 8 wherein said each socket is a zero insertion force socket.

10. A computer system of claim 8 wherein said each socket includes a guide member, said guide member guiding said memory chip onto said program-in-chip unit.

11. A computer system of claim 2 wherein said memory chip is fully enclosed within said computer enclosure.

12. A computer system, said computer system comprising:
an integrated circuit memory chip, said memory chip being an integrated circuit device having a read-only memory portion and a read-write memory portion, said read-only memory portion storing at least one executable application program and said read-write memory portion storing user input data, said user input data including preference settings, wherein said user input data and said at least one executable application are used to customize the system to a new preference setting;
a program-in-chip unit including at least one socket, each socket of said at least one socket being structurally adapted to removably mount said memory chip onto said program-in-chip unit, said each socket having a guide member, said guide member guiding said memory chip onto said program-in-chip unit;
a motherboard, said motherboard being structurally adapted to support said program-in-chip unit and being electrically interfacible with said memory chip;
a computer system enclosure, said computer system enclosure encasing said memory chip, said program-in-chip unit and said motherboard; and
an access panel, said access panel being located on said computer system enclosure and providing access to said memory chip.

13. A computer system of claim 12 wherein said memory chip is one of a plurality of memory chips being removably mounted on said program-in-chip unit.

14. A computer system of claim 12 wherein said socket is a zero insertion force socket.

15. A computer system of claim 12 wherein said motherboard includes a processor, said processor executing said at least one executable application program.

16. A computer system of claim 12 further comprising:
a daughterboard, said daughterboard being mounted on said motherboard.

17. A computer system of claim 16 wherein said daughterboard is structurally adapted to support said program-in-chip unit.

18. A computer system of claim 12 wherein said memory chip is fully enclosed within said computer enclosure.

19. A method of programming a computer system comprising:
storing at least one executable application program into a read-only memory portion of an integrated circuit memory chip;
mounting said memory chip onto a program-in-chip unit after said step of storing at least one executable application program;
storing user input data into a read-write memory portion of said memory chip, said user input data including preference settings;
loading said at least one executable application program into said computer system; and
executing said at least one executable application program, wherein the user input data and said at least one executable application are used to customize the system to a new preference setting.

20. A method of claim 19 further comprising:
encasing said memory chip, a program-in-chip unit and a motherboard, said encasing step being performed using a computer system enclosure.

21. A method of claim 20 further comprising:
accessing said memory chip through an access panel, said access panel being located on a computer system enclosure.

22. A method of claim 20 wherein said program-in-chip unit is structurally adapted to removably mount said memory chip onto said program-in-chip unit; and
a motherboard, said motherboard is structurally adapted to support said program-in-chip unit and being electrically interfacible with said memory chip.

23. A method of claim 19 wherein said memory chip is removably mounted onto said program-in-chip unit.

24. A method of claim 19 wherein said memory chip is one of a plurality of memory chips being removably mounted on said program-in-chip unit.

25. A method of claim 22 wherein said motherboard includes a processor, said processor performs said step of executing said at least one executable application program.

26. A method of claim 20 further comprising:
a daughterboard, said daughterboard being mounted on said motherboard.

27. A method of claim 26 wherein said daughterboard is structurally adapted to support said program-in-chip unit.

28. A method of claim 20 wherein said program-in-chip unit includes at least one socket, each socket of said at least one socket being structurally adapted to removably mount said memory chip onto said program-in-chip unit.

29. A method of claim 28 wherein said each socket is a zero insertion force socket.

30. A method of claim 28 wherein said each socket includes a guide member and said memory chip includes a guide groove, said guide member guiding said memory chip onto said program-in-chip unit.

* * * * *